United States Patent [19]

Napper

[11] 3,971,121

[45] July 27, 1976

[54] METHOD FOR EXTRACTING A MOUNTED ANCHOR BOLT AND ANCHOR BOLT EXTRACTOR THEREFOR

[76] Inventor: Jack C. Napper, 3815 Volt Ave., Long Beach, Calif. 90808

[22] Filed: Nov. 4, 1974

[21] Appl. No.: 520,774

Related U.S. Application Data

[63] Continuation-in-part of Ser. No. 368,852, June 11, 1973, abandoned.

[52] U.S. Cl. .............................................. 29/427
[51] Int. Cl.² ........................................ B23P 19/02
[58] Field of Search ............ 29/256, 282, 427, 217, 29/258, 264; 335/285; 85/68

[56] References Cited
UNITED STATES PATENTS

| | | | |
|---|---|---|---|
| 2,220,376 | 11/1940 | Mackal | 29/256 |
| 2,976,069 | 3/1961 | Meredith | 29/427 |
| 3,200,692 | 8/1965 | Catlin | 85/68 |
| 3,279,301 | 10/1966 | Fischer | 85/68 |
| 3,748,718 | 7/1973 | Russeu | 29/264 |
| 3,841,771 | 10/1974 | Shankwitz et al. | 29/256 |

FOREIGN PATENTS OR APPLICATIONS

| | | | |
|---|---|---|---|
| 1,057,829 | 5/1959 | Germany | 335/285 |

Primary Examiner—James L. Jones, Jr.
Attorney, Agent, or Firm—Charles A. Goodall

[57] ABSTRACT

A method for extracting a mounted anchor bolt secured within an anchor bolt mounting cavity in a mounting member, said method comprising inserting into a central opening of a central cylindrical hole in the anchor bolt an anchor bolt extractor tool and screwing into said anchor bolt said tool thereby releasing the anchor bolt from a conical wedge engaging a bottom portion of the anchor bolt within the mounting cavity and thereafter lifting the anchor bolt from said cavity. The anchor bolt extractor tool comprises a rod having an external tool connecting means end and adjacent thereto a screw threaded portion, having threads matable with anchor bolt screw threads located on an upper portion of an internal wall of said anchor bolt defining said cylindrical hole therein, said rod further having adjacent to said threaded portion thereof an un-threaded shank portion having a diameter smaller than that of said central cylindrical anchor bolt hole and having a length greater than a depth of said cylindrical hole from an internal termination of anchor bolt screw threads to the bottom portion of said anchor bolt, said shank length being less than a depth of said anchor bolt cylindrical hole, said shank portion terminating in an anchor bolt conical wedge abutment end.

6 Claims, 6 Drawing Figures

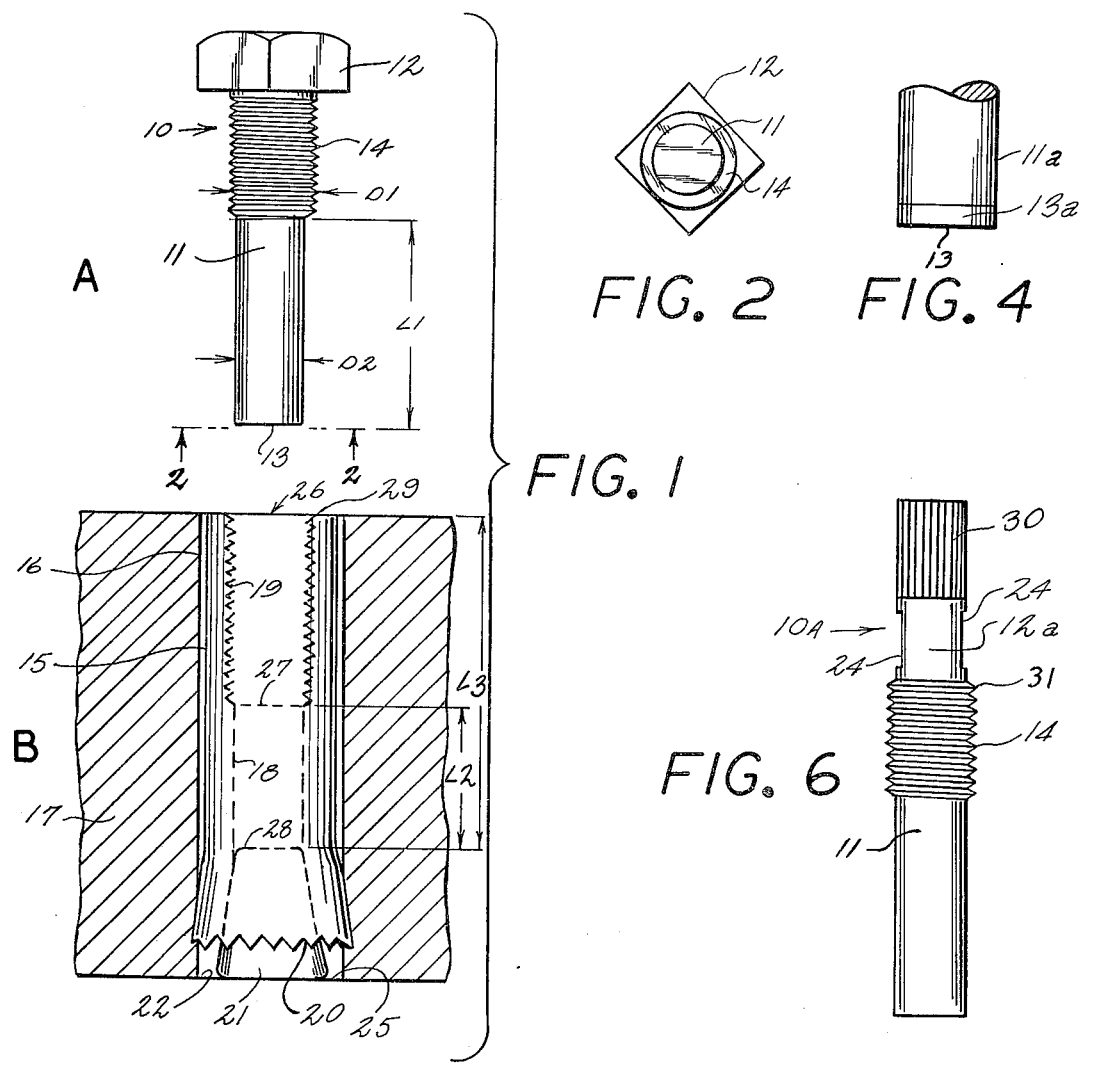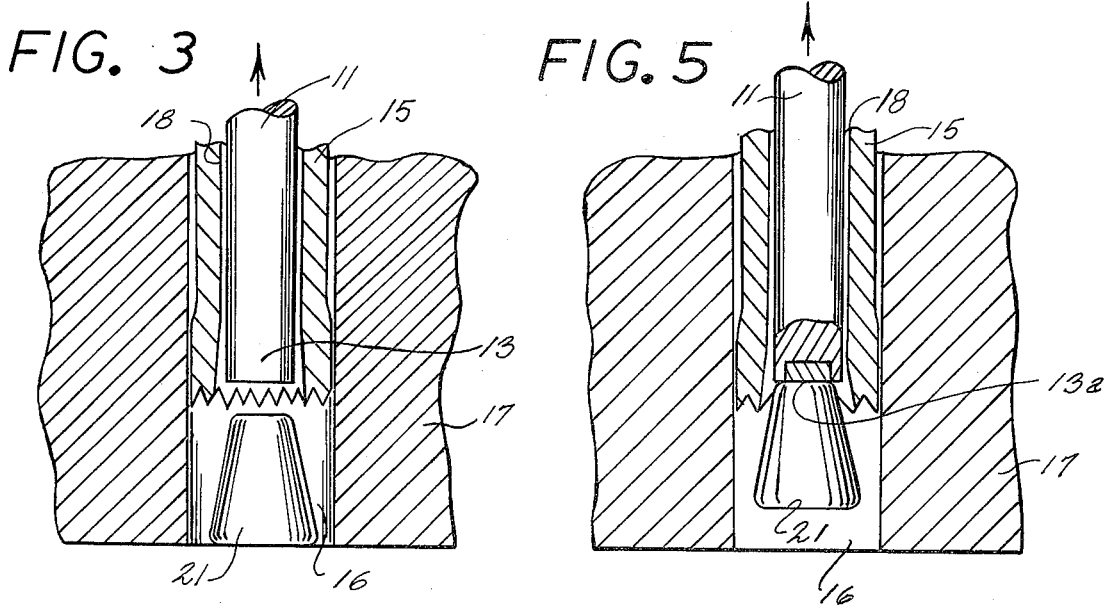

METHOD FOR EXTRACTING A MOUNTED ANCHOR BOLT AND ANCHOR BOLT EXTRACTOR THEREFOR

BACKGROUND OF THE INVENTION

This is a continuation-in-part of my application Ser. No. 368,852 filed June 11, 1973 now abandoned.

FIELD OF THE INVENTION

The present invention relates generally to anchor bolts of the type used in building structures and concrete and more particularly to a novel method for removing anchor bolts mounted in structural members and an anchor bolt extractor tool therefor.

DISCUSSION OF PRIOR ART

It is well known that anchor bolts are employed for stationarily securing machinery and the like to structural members such as concrete floors and the like. The anchor bolt assembly comprises in combination a hollow cylindrical member and a conical wedge member, said cylindrical member having screw threads on an upper portion of the interior wall circumscribing said hollow portion said wall thereafter extending axially through said cylindrical member and having a bottom opening wherein a small diameter portion of said conical wedge member may be inserted when the cylindrical member is placed into a structural member anchor bolt cavity. The cylindrical member is driven into the cavity wherein the wedge is inserted, small diameter side up, and the wedge causes the bottom end of the cylindrical member to flare outwardly into fixed contact ith walls of the cavity in the structural member. This assembly when mounted thus requires great force to remove and is normally considered non-removable in that to remove the anchor bolt generally requires removal of part of the structural member into which it is mounted. At the present time, there is no method for removal of the anchor bolt without causing severe damage to the structural member into which it is mounted or by drilling the anchor bolt out of the cavity. If a mistake is made in placing the anchor bolt in an unwanted location, this generally requires re-positioning one or all of the anchor bolts when installing the machinery which is to be secured by the mounted anchor bolts, or doing without one anchor-bolt attachment. The present invention solves these problems by providing a method whereby anchor bolts may be easily removed from the structural members into which they are mounted and a tool therefor.

SUMMARY OF THE INVENTION

It is an object of this invention to provide a method whereby anchor bolts mounted in structural members may be quickly and easily removed when it is no longer desired that the anchor bolt be inbedded in the structural member.

It is a further object of this invention to provide an anchor bolt extractor tool for use in removing anchor bolts from structural members when the removal thereof is desired.

It is another object of this invention to provide an anchor bolt extractor tool wherein a magnet is imbedded in the anchor bolt conical wedge abutment end of the shank portion thereof for lifting the conical wedge from the anchor bolt mounting cavity as the anchor bolt is extracted from the cavity.

Other objects of the present invention are to provide an anchor bolt extractor which is simple in design, inexpensive to manufacture, rugged in construction, easy to use and efficient in operation.

These and other objects will be readily apparent to one skilled in the art involving use of anchor bolts and the like upon reading the disclosure of the preferred embodiment and the claims herein.

In summary, these and other objects of the invention are accomplished by a method for extracting a mounted anchor bolt secured within an anchor bolt mounting cavity in a mounting member, said method comprising inserting into a central opening of a central cylindrical through hole in the anchor bolt an anchor bolt extractor tool and screwing said tool into said anchor bolt thereby releasing the anchor bolt from a conical wedge engaging a bottom portion of the anchor bolt within the mounting cavity, said wedge having forced the bottom of said anchor bolt into fixed abutment with the walls of said cavity. Upon disengaging said conical wedge from the anchor bolt the anchor bolt may thereafter be lifted from the cavity with application of a relatively small lifting force. The anchor bolt extractor tool comprises a rod having an external tool connecting means end and adjacent thereto a screw threaded portion having threads matable with anchor bolt screw threads located on an upper portion of an internal wall of said anchor bolt, said wall defining said cylindrical hole therein, said rod further having adjacent to said threaded portion thereof an unthreaded shank portion having a diameter smaller than that of said anchor bolt central cylindrical through-hole and having a shank length greater than an anchor bolt cylindrical through-hole length from an anchor bolt screw thread termination to a top portion of said conical wedge in a mounted anchor bolt, said shank length being less than a total anchor bolt cylindrical through-hole length from an anchor bolt screw thread commencement end, to said conical wedge top portion, said shank portion terminating in an anchor bolt conical wedge abutment end.

BRIEF DESCRIPTION OF THE DRAWINGS

FIG. 1 is a combination plan view of the anchor bolt extractor tool "A" and a cross sectional view of a mounting member having an anchor bolt cavity therein and having an anchor bolt secured therein, "b".

FIG. 2 is a bottom view of an anchor bolt extractor as view on line 2—2 of FIG. 1 A.

FIG. 3 is a fragmented side cross-sectional view showing the orientation of an extractor tool shank within an anchor bolt after disengagement of the anchor bolt and the conical wedge within a mounting cavity within a mounting member.

FIG. 4 is a fragmentary side view of an anchor bolt extractor tool shank and anchor bolt conical wedge abutment end having a permanent magnet inserted fixedly in said end.

FIG. 5 is a fragmentary side cross-sectional view showing the orientation of an extractor tool shank within an anchor bolt after disengagement of the anchor bolt and the conical wedge within a mounting cavity within a mounting member wherein the tool shank anchor bolt abutment end has a permanent magnet inserted fixedly therein and showing the conical wedge adhering thereto, as the anchor bolt is being lifted out of said cavity.

FIG. 6 shows a side elevation view of an anchor bolt extractor tool having a drill shank means opposite the extractor tool shank for use with a drill for removing mounted anchor bolts.

DESCRIPTION OF PREFERRED EMBODIMENT

Referring to the drawings, FIGS. 1 and 3, the method for extracting a mounted anchor bolt and the anchor bolt extractor tool used therefor of this invention is described hereinbelow:

FIG. 1A shows an anchor bolt extractor tool 10 ready for insertion into a mounted anchor bolt 15 central opening 26, said anchor bolt having been mounted in a structural member 17, (shown in FIG. 1B) within a structural member anchor bolt mounting cavity 16 having been fixedly mounted therein by forcing the anchor bolt down onto a conical wedge 21 located on a cavity floor 25 said conical wedge having thereby been forcedly inserted into an anchor bolt cylindrical through-hole 18 thereby expanding an anchor bolt bottom portion 20 into fixed contact with a lower cavity wall 22. The anchor bolt through-hole has an upper screw threaded portion 19 normally used for bolting objects thereto for fixing said objects into place on the structural member. The anchor bolt extractor tool 10 comprises a rod 10 having an external tool connecting means end 12 (herein shown to be a four sided bolt head) and adjacent thereto a screw threaded portion 14 having threads matable with the anchor bolt upper screw threaded portion 19, said rod further having adjacent to said threaded portion 14 an un-threaded shank portion 11 having a diameter $D_2$ smaller than that of anchor bolt cylindrical through-hole diameter $D_1$ and having a length $L_1$ greater than an anchor bolt cylindrical through-hole length $L_1$ from an anchor bolt screw thread termination 27 to a conical wedge top portion 28 in a mounted anchor bolt 15 (FIG. 1B), said shank length $L_1$ being less than a total anchor bolt cylindrical through-hole length $L_3$ from an anchor bolt screw thread commencement end 29, to said conical wedge top portion 28, said shank terminating in an anchor bolt conical wedge abutment end 13.

The method for extracting a mounted anchor bolt comprises inserting the anchor bolt extractor tool 10 conical wedge abutment end through the central opening 26 of a mounted anchor bolt 15 until the tool threaded portion 14 contacts the anchor bolt screw thread commencement end 29, thereafter screwing the tool into the anchor bolt using suitable tool such as a wrench or the like until the end 13 of the rod engages the top portion 28 of the wedge 21, thereafter applying sufficient rotational force to lift the anchor bolt away from the conical wedge thereby upwardly disengaging the anchor bolt from the conical wedge and permitting the anchor bolt bottom portion to contract inwardly and away from the cavity wall 22 with which the anchor bolt had been fixedly in contact, as the anchor bolt is lifted upwardly and out of the cavity.

Other embodiments of the anchor bolt extractor tool are shown in FIGS. 4, 5, and 6. Referring to FIGS. 4 and 5 the numeral 11A designates the shank of a tool 10 shown in FIG. 1A having a permanent magnet 13 A, fixedly inserted in the anchor bolt conical wedge abutment end 13 of said shank for removing the conical wedge 21 from the structural member anchor bolt mounting cavity 16. The removal of the wedge may be accomplished simultaneously with the removal of the anchor bolt or subsequent thereto.

Referring to FIG. 6 an anchor bolt extractor tool 10A is shown having screw threaded portion 14 and shank portion 11 as described above and having an external tool connecting means end 12A comprising a rod 12A having a fluted end 30 adaptable for attaching a drill means or impact wrench thereto, said rod having intermediate between said fluted end and the upper end 31 of the threaded portion a flattened portion 24 on opposite sides of said rod each of said flattened portions being parallel to each other.

Another embodiment of the method comprises that set forth above wherein the said extractor tool is a two piece assembly comprising screw threaded bolt having threads mating with the anchor bolt threads and a rod having dimensions of those set forth for the shank of said described extractor tool, wherein said rod is first inserted into said anchor bolt through-hole and said screw threaded bolt is then screwed into said anchor bolt thereby disengaging said conical wedge from said anchor bolt and forcing said anchor bolt upwardly therefrom and outwardly with respect to said cavity.

The anchor bolt extractor tool may be constructed of any material suitable for manufacturing tools requiring manipulation with wrenches and the like and where significant stress forces are applied thereto.

The methods described herein and the tools herein described have been disclosed for illustrative purposes, and numerous method and tool modifications in design and manner of performing the method are possible within the scope of the invention.

I claim as my invention:

1. A method for extracting a mounted anchor bolt secured to an anchor bolt cavity wall within a mounting member, said mounted anchor bolt comprising in combination a hollow cylindrical member and a conical wedge member, said hollow cylindrical member having a central cylindrical wall circumscribing an anchor bolt through-hole, said wall having screw threads cut into an upper wall portion extending from a top through-hole opening to a screw thread termination end intermediate said through-hole, said screw threads having an internal diameter substantially equal to or greater than the through-hole diameter at said thread termination end, said thread termination end coinciding with an upper conical wedge seat wall portion said through-hole extending below said thread termination end and having seated therein said conical wedge, said conical wedge having a top small diameter portion seated within said seat and a conical wedge bottom large diameter portion resting on a bottom of said anchor bolt mounting cavity, said wedge bottom large diameter being smaller than said anchor bolt cavity diameter and larger than said through-hole, said anchor bolt thereby being secured within said cavity, said method for extracting said mounted anchor bolt comprising, inserting into said mounted anchor bolt through-hole through said top through-hole opening a tool having threaded portion matable with said anchor bolt threads, said threaded portion being intermediate a top external tool connecting means and a cylindrical unthreaded shank portion, said shank portion having a diameter smaller than said through hole and having a shank length greater than a distance between the anchor bolt screw thread termination and the conical wedge top small diameter portion seated within the anchor bolt conical wedge seat, screwing said tool into the anchor bolt thereby forcing a disengagement between the conical wedge member and the anchor bolt hollow cylindrical member, and further forcing upwardly said anchor bolt hollow cylindricl member from the conical wedge member thereby releasing said anchor bolt hollow cylindrical member from the conical wedge member thereby releasing said anchor bolt hollow cylindrical member from fixed engagement with the anchor bolt cavity wall, and lifting the anchor bolt hollow cylindrical member and the conical wedge member out of the cavity.

2. The combination of an anchor bolt and a tool for extracting the same, said anchor bolt having a central through-hole having threads cut into an upper portion thereof, said threads having a thread starting end adjacent the top of said anchor bolt and a terminating end at a point intermediate said through-hole, the lower portion of said through-hole comprising a conical wedge seat having a conical wedge seated therein, said wedge having a small diameter top portion having a diameter smaller than the anchor bolt through-hole and a large diameter bottom portion larger in diameter than said through-hole diameter thereby expanding said wedge seat against a cavity wall within a mounting member when said anchor bolt is driven toward said wedge, said tool consisting of a rod having a tool engaging means at one end thereof, a screw threaded portion extending away from said one end of said rod, said threaded portion mating with said anchor bolt screw threads, said rod further including a cylindrical shank portion below said threaded portion, said shank portion having a diameter smaller than the diameter of the anchor bolt through-hole and having a length greater than the distance between the anchor bolt screw thread terminating point and the top portion of said conical wedge, and said shank having a length less than the distance from the thread starting end of said bolt to the top of said conical wedge, said shank terminating in an abutment end for contacting said top portion of said conical wedge.

3. The combination of claim 2 wherein a permanent magnet is fixedly inserted in the abutment end of said shank.

4. The combination of claim 2 wherein said tool engaging means comprises a bolt head means.

5. The combination of claim 2 wherein said tool engaging means comprises a rod adaptable to a drilling tool means.

6. The combination of claim 2 wherein said rod has flattened portions thereon for adapting said rod to be turned by a wrench or the like.

* * * * *